Feb. 17, 1953 G. T. PYE ET AL 2,628,453
APPARATUS FOR DETACHING AND REMOVING A SHEET
FROM AN UPWARDLY TRAVELING RIBBON OF GLASS
Filed May 5, 1948 2 SHEETS—SHEET 1

George Telford Pye
Harold Goulbourne Jones
Inventors
By
Morrison, Kennedy & Campbell
Attorneys Feb. 17, 1953 G. T. PYE ET AL 2,628,453
APPARATUS FOR DETACHING AND REMOVING A SHEET
FROM AN UPWARDLY TRAVELING RIBBON OF GLASS
Filed May 5, 1948 2 SHEETS—SHEET 2
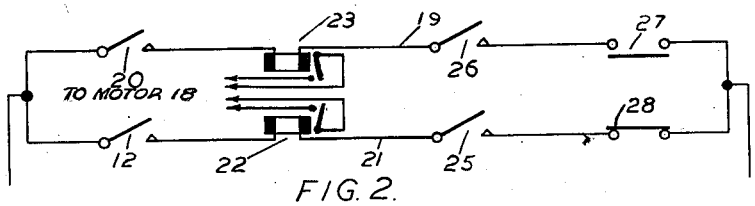
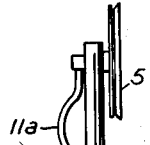
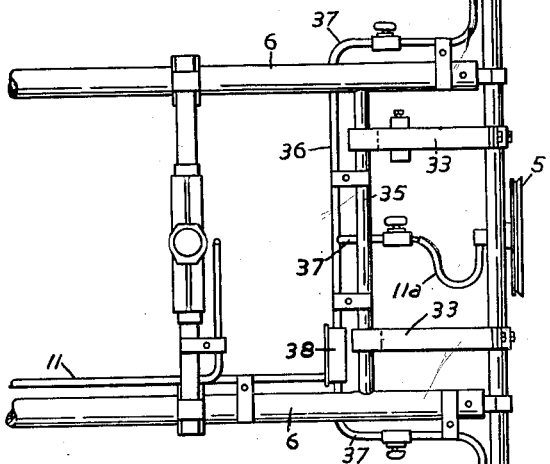
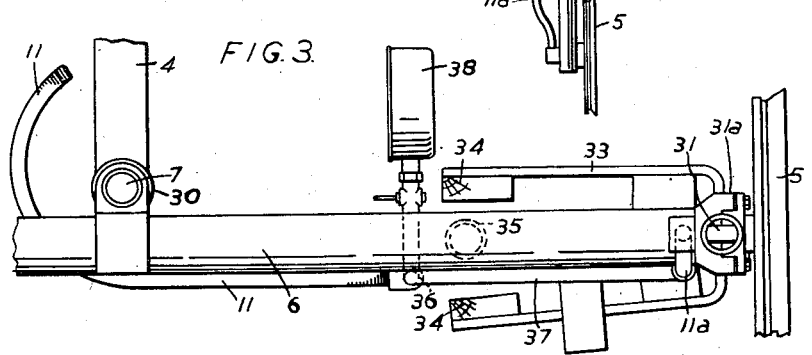

Patented Feb. 17, 1953

2,628,453

UNITED STATES PATENT OFFICE 2,628,453

APPARATUS FOR DETACHING AND REMOVING A SHEET FROM AN UPWARDLY TRAVELING RIBBON OF GLASS

George Telford Pye, Prescot, and Harold Goulbourne Jones, Saint Helens, England, assignors to Pilkington Brothers Limited, Liverpool, England, a British company Application May 5, 1948, Serial No. 25,228
In Great Britain February 17, 1948

8 Claims. (Cl. 49—48)

This invention relates to apparatus for drawing glass upwardly from a body of molten glass.

In such apparatus sheets of glass of predetermined size are usually cut from the leading free end of the upwardly travelling ribbon of glass by transversely scoring the glass at the predetermined distance from the leading edge, the glass is scored by a cutter automatically set in motion by the leading edge actuating a control switch disposed so that the cutter always actuates when the leading edge has travelled the aforesaid predetermined distance from the path of the cutter.

After the cutter has made a score line operatives grip the sheet at each side, tilt it slightly towards them, thereby breaking off the sheet at the score line and take it away. Unless the sheet is removed so as to clear the upwardly moving leading edge just created, the leading edge is chipped or shelled. As the glass is hot when so removed it is difficult to handle. Instead of a cutter a hot wire is sometimes used to prepare the glass for severing.

The main object of the present invention is to provide means for mechanically removing the glass above a score line of severance in such manner as to avoid shelling of the edge of the severed sheets, and in a more expeditious manner than is achieved by man-handling the sheet.

Another main object is to provide automatic control of the mechanical removing means whereby it is advanced to engage the glass in synchronism with the operation of the scoring device, or other means for preparing the glass for severing, for example the hot wire, and is only retracted when the removing means has securely gripped the sheet.

In carrying out the present invention suckers, operated by means sensitive to the arrival of the leading edge of a drawn ribbon of glass at a point near the end of its travel, are brought into engagement with the glass above the score line, and then at the beginning of the rearward movement of the suckers by which a pull is impressed on the glass to sever it at the score line, modifying their movements so as to bodily lift the sheet securely held by the suckers, clear of the rising leading edge.

The suckers are mounted on transporting means so that the glass may be rapidly moved from the plane of the rising ribbon of glass to a dumping table on which it is cooled.

Apparatus for upwardly drawing a sheet of flat glass from a body of molten glass constructed according to the present invention is characterised by the combination with means for producing a line of severance e. g. a score line transversely of the glass at a predetermined distance from the leading edge, of rockable suction means mounted to be advanced to engage the sheet with suckers above the intended line of severance and to be retracted from the path of the rising sheet as soon as the suckers have gripped the sheet, and means for constraining the suckers to move upwardly as they commence to retract, whereby the glass above the line of severance is severed from and then lifted clear of the rising leading edge created at the score line of severance.

The apparatus preferably comprises a trackway, supported above the leading edge of the glass when the latter is disposed at the top of its travel, a carriage on the trackway, means for forwardly moving the carriage to the glass and for retracting the carriage away from the sheet, a support depending from the carriage, a rocker horizontally pivoted on said support, suckers on the said rocker to engage the glass when the carriage is advanced, a horizontally pivoted arm mounted below said carriage, a rigid link pivoted to said arm and said rocker (so that the arm is lowered about its pivot as the suckers engage the rising glass), and a ramp below said trackway, having a profile and so disposed as to further depress the arm as the carriage commences to retract with the severed sheet at such a speed as to maintain the severed sheet clear of the rising sheet.

In order that the carriage may be automatically moved forwardly to the glass and retracted therefrom so that the glass above the score line is removed after the formation of the score line the apparatus preferably comprises an electric motor, means driven by said motor for moving the carriage in each direction, a switch controlling the motor "forward" circuit, disposed to be actuated by the leading edge of the glass as it approaches the end of its travel, a cock controlling the vacuum line disposed to be actuted by the carriage in each direction of travel, a pressure operated switch in the vacuum line adapted to close the motor "retracting" circuit after the suckers have engaged the glass and a sufficient partial vacuum is developed to assure the suckers holding the glass, and limit switches actuated by the carriage towards the end of each forward and retracting movement to open the respective motor circuit.

If the length of the excursions of the carriage permit, the switch controlling the motor circuit may be the switch which causes the operation of a scoring device, but where the time interval does not permit, a separate switch, operated by the leading edge of the glass, is employed. The pressure operated switch is provided to accommodate the variations in the time the suckers take to grip the sheet and thereby the retracting circuit is only closed when the sheet is properly gripped.

In order that the invention may be more clearly understood a preferred embodiment will now be described by way of example, reference being made to the accompanying drawings, in which:

Figure 2 is a diagram of the electrical connections used in the apparatus of Figure 1.

Figure 3 shows in side elevation to an enlarged scale the means for mounting the suckers.

Figure 4 is a plan of the construction shown in Figure 3 but to a revised scale.

Figure 1:
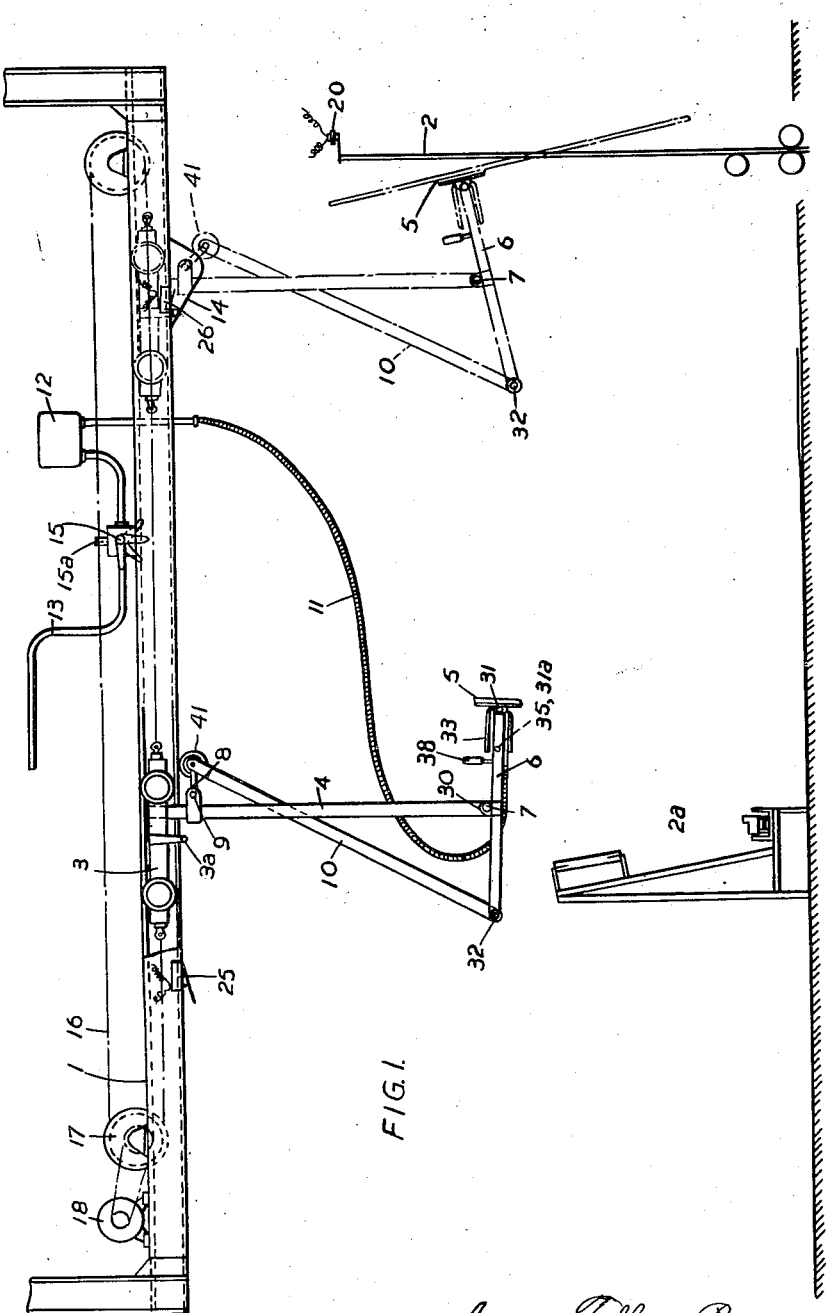
Figure 1 is a diagrammatic illustration of apparatus in elevation according to the invention.

According to this embodiment an overhead trackway 1 is provided which runs perpendicularly to the glass 2 as it approaches the latter, when viewed in plan, and on the trackway 1 is a carriage 3 from which depends, between the tracks, a support 4 on which the suckers 5 are mounted, the support 4 being so carried that it can be rotated on its axis. The suckers 5 are carried on rockers 6 pivoted on a horizontal axis at 7 about midway of their length on the support 4, these rockers being normally disposed at a small angle to the horizontal.

At the top of the depending support 4 an arm 8 is at one end mounted on a horizontal pivot 9 carried by the support 4, and the other end of the arm is connected by a rigid link 10 to the rockers 6, the normal disposition of the arm 8 being in horizontal plane and the link being hinged both to the arm and to the rockers and provided with a cam follower 41 at its upper end.

The suckers 5 are connected by a flexible line diagrammatically indicated at 11 through a pressure operated switch 12 to the vacuum line 13. The switch 12 is a known form of switch actuated by movement of a diaphragm or piston, one side of which is exposed to the atmosphere while the other side is in contact with the vacuum line pressure. With such a construction, when the carriage 3 is advanced until the suckers 5 engage the vertical ribbon of glass 2, the sucker rockers 6 in consequence of their engagement of the suckers 5 with the rising glass tilt upwardly into a horizontal disposition, thereby lowering the arm 8 at the top of the support below its normal horizontal plane.

Under the trackway 1 is arranged a ramp or cam 14 (shown greatly enlarged) which stands in the path of the cam follower 41. In the forward movement the arm 8 passes the cam 14 before engaging of the glass by the suckers and the cam follower bears on the underside of the trackway on the side of the cam nearest the glass sheet. The profile of the cam is such that during this return movement the ramp 14 quickly further depresses the cam follower 41, link 10 and arm 8, thereby raising the suckers 5 relatively to the rising glass at such a rate that the suckers, at the time of pulling on the glass 2 engaged by them, also raise the glass sheet clear of the rising leading edge created by severing off the sheet, and maintain the severed sheet clear of the rising ribbon whilst intersecting the path of the ribbon.

On the right of Figure 1 is shown in chain lines the position of the suckers and the severed sheet just after the commencement of the return movement of the carriage.

The vacuum line 13 is provided with an oscillatory trip cock 15 disposed in the path of the carriage 3, or a member carried thereon, so as to be operated by the forward movement of the carriage to connect the suckers to suction and thereby develop the necessary partial vacuum in the line 13, and during the return movement of the carriage to destroy the partial vacuum. A bleed hole 15a is provided on the trip cock 15 so that the sheet 2 is slowly released from the suckers 5 when over the dumping table as will be well understood in the art.

The carriage is mounted on an endless chain 16, the driving sprocket 17 of which is connected to a motor 18, and the circuit 19 (Figure 2) of the motor, which enforces forward movement of the carriage, and is herein referred to as the "forward" circuit, is completed by a switch 20 disposed across the plane of the rising ribbon of glass, so that when the leading edge has arrived at a predetermined point, the switch is operated to close the forward circuit and advance the carriage so that the suckers engage the glass, at a time when a score line will have been formed on the glass, the scoring device being actuated by a switch (not shown) also actuated by the leading edge of the glass in known manner.

When the carriage 3 has completed its forward movement, the suckers 5 having engaged the glass 2, a partial vacuum is developed in the pressure operated switch 12 until the suction is sufficient for the suckers to hold the glass, and this pressure operated switch is connected with relay means indicated at 22 for closing the motor circuit when the required partial vacuum is developed which causes the return movement of the carriage with the glass, and is herein referred to as the "retracting" circuit 21 (Figure 2).

Mounted in the path of an operating arm 3a mounted on the carriage 3, and disposed at each end of the path of the movement of the carriage are limit switches 25 and 26, which normally tend to close the circuits causing the movement of the carriage, so that when the carriage is being moved forward, the limit switch 26 near the rising ribbon of glass, is operated to open the forward circuit 19 as soon as the suckers 5 are sufficiently advanced to engage the glass 2, and at the other end of the trackway 1 the limit switch 25 determines the end of the return movement of the carriage by opening the retracting circuit 21, relay means being provided as indicated at 23 for closing the motor circuit and causing forward movement of the carriage, when the switch 20 is closed by the rising ribbon of glass.

The circuits may be provided with interlocking switches 27, 28, in known manner, so as to prevent simultaneous operation of the two motor circuits.

By introducing the pressure operated switch 12, control of the retracting circuit 21 is achieved in that the circuit is only closed after the desired partial vacuum is developed in the vacuum system which from the point of view of time interval is a variable quantity.

From the foregoing it will be observed that apparatus according to the invention comprises suckers 5 mounted on the carriage 3, the excursions of which are under the control of the leading edge of glass and the pressure operated switch 12 so as to permit the suckers 5 to remove glass above a score line after the score line has been formed.

The suckers may engage the glass immediately after the formation of the score line or during the formation of the score line, or immediately before the formation of the score line.

By the present invention expeditious manipulation of the hot cut off sheet of glass is attainable, and by reason of the manner of removing the glass from the path of rising ribbon, shelling of both the trailing edge of the severed sheet and the leading edge of the rising sheet is eliminated, and moreover as the carriage arrives at the position in its return journey to operate the trip cock and cut off suction, the suckers may become disposed over a trackway on which runs a dumping table 2a so that the glass is received from the suckers and rapidly removed from the path of movement of the suckers to and from the glass.

Alternatively the glass may be removed by hand from the suckers when the partial vacuum is destroyed, and fans (not shown) may be disposed at the side of the path of the movement of the glass when held by the suckers so as to cool the glass before it is so handled.

The depending support may comprise a post 4 depending rigidly from the carriage 3 and carrying at the lower end a tubular bearing 30 which receives a horizontal spindle 7 connected to the rockers on which the suckers, preferably three in horizontal alignment are carried, the spindle accordingly constituting the axis member for the rockers.

The rockers preferably comprise two parallel arms spaced apart but connected by a carrier 31 for the suckers at one end and by a rod 32 at the other for attachment of the link 10. The carrier is rotatably mounted in bearings 31a at the ends of the arms, and on the outside thereof at each end, and at the middle a sucker is mounted, and to each side of the middle sucker a pair of levers 33 are individually clamped to the carrier, the levers at their ends carrying weights 34 and straddling a limit member constituted by a cross bar 35 connecting the rocker arms.

In such arrangement the carrier extends from each side of the rocker to carry the outer suckers. The vacuum line between the vacuum operated switch 12 and the suckers 5 comprises the connection 11 between the switch 12 and a pipe 36 mounted transversely of the rockers 6. The pipe 36 is in turn provided with branch pipes 37, one on each end of the pipe 36 and one in the middle, lying parallelly with the rockers. Each of the branches 37 are connected through the intermediary of a length of flexible tubing 11a to one of the suckers, that is to say, the outer branches 37 are connected to the outer suckers and the middle branch to the middle sucker. This arrangement is most clearly shown in Figure 4 of the drawings. The transverse pipe 36 carries the gauge 38. The gauge is employed when setting the adjustable operating point of the pressure operated switch, so that the switch closes at a partial vacuum which experience has shown to be sufficient to hold the glass and yet insufficient to break the glass by bending at the area to which the suction is applied. When the carriage is hand actuated the operator may watch the gauge to see that the partial vacuum developed is sufficient to assure that the suckers efficiently grip the glass before the carriage commences to return.

We claim:

1. Means for detaching and removing a sheet of flat glass from an upwardly travelling ribbon of glass provided with lines of severance at predetermined intervals, the means comprising rockable suction means mounted to be advanced to engage the sheet with suckers above the intended line of severance and to be retracted from the path of the rising sheet as soon as the suckers have gripped the sheet, a cam follower operatively connected to the suckers and cam means in the path of the cam follower to act on the cam follower and thereby constrain the suckers to move upwardly as they commence to retract, whereby the glass above the line of severance is severed from and then lifted clear of the rising leading edge created at the line of severance.

2. Means for detaching and removing a sheet of flat glass from an upwardly travelling ribbon of glass provided with lines of severance at predetermined intervals, the means comprising a trackway supported above the leading edge of the sheet, said trackway being disposed at right angles to the path of the sheet, a carriage on the trackway, means for forwardly moving the carriage to the sheet and for retracting the carriage from the sheet, a support depending from the carriage, a rocker horizontally pivoted on said support, suckers on said rocker to engage the sheet when the carriage is advanced, a horizontally pivoted arm mounted below said carriage, a rigid link pivoted to said arm and said rocker so that said arm is lowered about its pivot as the suckers engage the rising sheet, and a ramp below said trackway in the return path of said arm and having a profile and being so disposed that as the carriage commences to retract with the severed sheet the said arm is depressed further at such speed as to maintain the severed sheet clear of the rising sheet.

3. Means for detaching and removing a sheet of flat glass from an upwardly travelling ribbon of glass provided with lines of severance at predetermined intervals, the means comprising a trackway supported above the leading edge of the sheet, said trackway being disposed at right angles to the path of the sheet, a carriage on the trackway, an electric motor, means driven by the said electric motor for moving the carriage forwardly to the sheet and for retracting the carriage from the sheet, an electric circuit controlling the forward movement of the carriage, a switch in the said circuit so disposed as to be actuated by the leading edge of the said sheet as it approaches the end of its travel, a second circuit for controlling the retractive movement of the carriage, a limit switch in each of the said circuits actuated by movement of the carriage as it reaches the end of each movement, a support depending from the carriage, a rocker horizontally pivoted on said support, suckers carried by the said rocker to engage the sheet when the carriage is advanced, a vacuum line to said suckers, a cock controlling connection of vacuum to the said line disposed so as to be actuated to open by the forward movement of the carriage and to close by the retractive movement of the carriage, a horizontally pivoted arm mounted below said carriage, a rigid link pivoted to said arm and said rocker whereby said arm is lowered about its pivot as the suckers engage the sheet, a ramp below said trackway in the path of said arm having a profile such that the said arm is depressed further and at such speed as to maintain the severed sheet clear of the rising sheet of glass as the carriage commences to retract with the severed sheet of glass, a pressure operated switch in the said vacuum line adapted to close the said second circuit and initiate the retractive movement of said carriage after the suckers have engaged the sheet and sufficient partial vacuum has developed therein for the suckers to hold the sheet.

4. Means according to claim 3 wherein the said rocker comprises parallel arms carrying in bearings a horizontal support on which the said suckers are mounted, the said horizontal support being capable of limited turning movement in the bearings to allow the suckers to accommodate themselves to the sheet of glass.

5. Means for detaching and removing a sheet of flat glass from an upwardly travelling ribbon of glass provided with lines of severance at predetermined intervals, the means comprising a trackway supported above the leading edge of the sheet, a carriage on said trackway, rockable suction means comprising suckers carried by and depending from said carriage, a vacuum line to the suckers, a cam follower operatively connected to the suckers, tractive means to advance the carriage to engage the sheet with the suckers above a line of severance and to retract the carriage as soon as the suckers have engaged and gripped the sheet of glass, cam means attached to the trackway to engage the cam follower and thereby cause the suckers to move upwardly as carriage commences to retract, whereby the sheet above the line of severance is severed from and then lifted clear of the rising leading edge formed at the line of severance.

6. Means according to claim 5 wherein the said suckers are connected to said vacuum line by way of a trip cock which is supported by the trackway and is arranged with the trip cock in the path of the said carriage so that it is closed on the retraction of the carriage and opened on the forward movement of the carriage.

7. Means according to claim 5 wherein the tractive means comprises an electric motor operatively connected to said carriage, said motor being provided with a forward control circuit governing the forward movement of the carriage and a retracting control circuit governing the retracting movement of the carriage, a switch responsive to movement of the leading edge of the sheet to close the forward control circuit and a limit switch responsive to movement of the carriage to open the forward control circuit, a pressure operated switch in the vacuum line of the suckers operating to close the retracting control circuit when sufficiently low pressure is developed in the said line for the suckers to grip the sheet and a limit switch responsive to movement of the carriage to open the retracting control circuit.

8. Means for detaching and removing a sheet of flat glass from an upwardly travelling ribbon of glass provided with lines of severance at predetermined intervals, the means comprising suckers to engage the sheet, a cam follower operatively connected to the suckers, a carrier for the said suckers, tractive means operable in one direction to move the carrier and suckers to engage the sheet above a line of severance, a vacuum line connected to the said suckers, a cock in the vacuum line arranged to be opened by the forward movement of the said carrier so that the pressure in the suckers on engaging the sheet is reduced to cause the suckers to hold the glass, said tractive means operable in a reverse direction to retract the carrier when the suckers have engaged and held the sheet and cam means in the path of the cam follower to displace the cam follower whereby to raise the suckers at the beginning of the retracting movement whereby to lift the severed sheet of glass clear of the rising edge of the ribbon of glass.

GEORGE TELFORD PYE.
HAROLD GOULBOURNE JONES.

REFERENCES CITED

The following references are of record in the file of this patent:

UNITED STATES PATENTS

| Number | Name | Date |
|---|---|---|
| 1,741,026 | Koupal et al. | Dec. 24, 1929 |
| 1,905,748 | Redshaw | Apr. 25, 1933 |
| 1,922,327 | Redshaw | Aug. 15, 1933 |
| 1,931,700 | Murphy et al. | Oct. 24, 1933 |

FOREIGN PATENTS

| Number | Country | Date |
|---|---|---|
| 881,834 | France | May 10, 1943 |